Aug. 25, 1964 R. A. CRUZ 3,145,483

TEST BOARD FOR ELECTRONIC CIRCUITS

Filed May 4, 1961

INVENTOR.
RUBEN A. CRUZ

BY Barnes & Seed

ATTORNEYS

United States Patent Office 3,145,483
Patented Aug. 25, 1964

3,145,483
TEST BOARD FOR ELECTRONIC CIRCUITS

Ruben A. Cruz, 14435 2nd SW., Seattle, Wash.
Filed May 4, 1961, Ser. No. 107,793
3 Claims. (Cl. 35—19)

This invention relates to a circuit mounting device of the type commonly known as a "bread board," and which is used primarily for assembling an electric circuit from a diagrammatic sketch for test purposes.

Since the interrelationship of circuit components is more readily comprehended in a diagrammatic sketch, in the design of an experimental circuit, it is desirable that the original circuitry and any modifications thereof be first sketched and then translated into actual circuitry. If each component in the circuit be placed physically close to its corresponding symbol in the diagrammatic sketch, construction of the circuit is greatly facilitated and the possibility of errors is eliminated.

Therefore, it is a general object of this invention to provide a mounting device by which a circuit may be quickly and easily constructed as a substantial trace, from an associated diagrammatic sketch.

It is also a general object to provide a mounting device so arranged that changes may be easily and quickly made both on the diagrammatic sketch and on the board.

More specifically it is an object to provide a transparent mounting plate with an underlying removable tray which accommodates a diagrammatic sketch so that each electric component may be placed in vertical alignment with the corresponding symbol on the sketch.

Another specific object is to provide a localizing slideway for the tray and to provide the tray with markings corresponding to and correlated with established terminal locations on the mounting board.

A further specific object is to engineer a board having perfected mountings for the terminal coils.

Yet another specific object is to so locate the terminal coils along with auxiliary holes, a ground strip and binding posts, that the actual build-up of the circuit is more readily accomplished.

The foregoing together with other objects and advantages will appear and be understood in the course of the following description and claims, the invention consisting in the novel construction and in the adaptation and combination of parts hereinafter described and claimed.

Figures 1, 2, 3, 4, 5, 5A, 6, 7, 8:
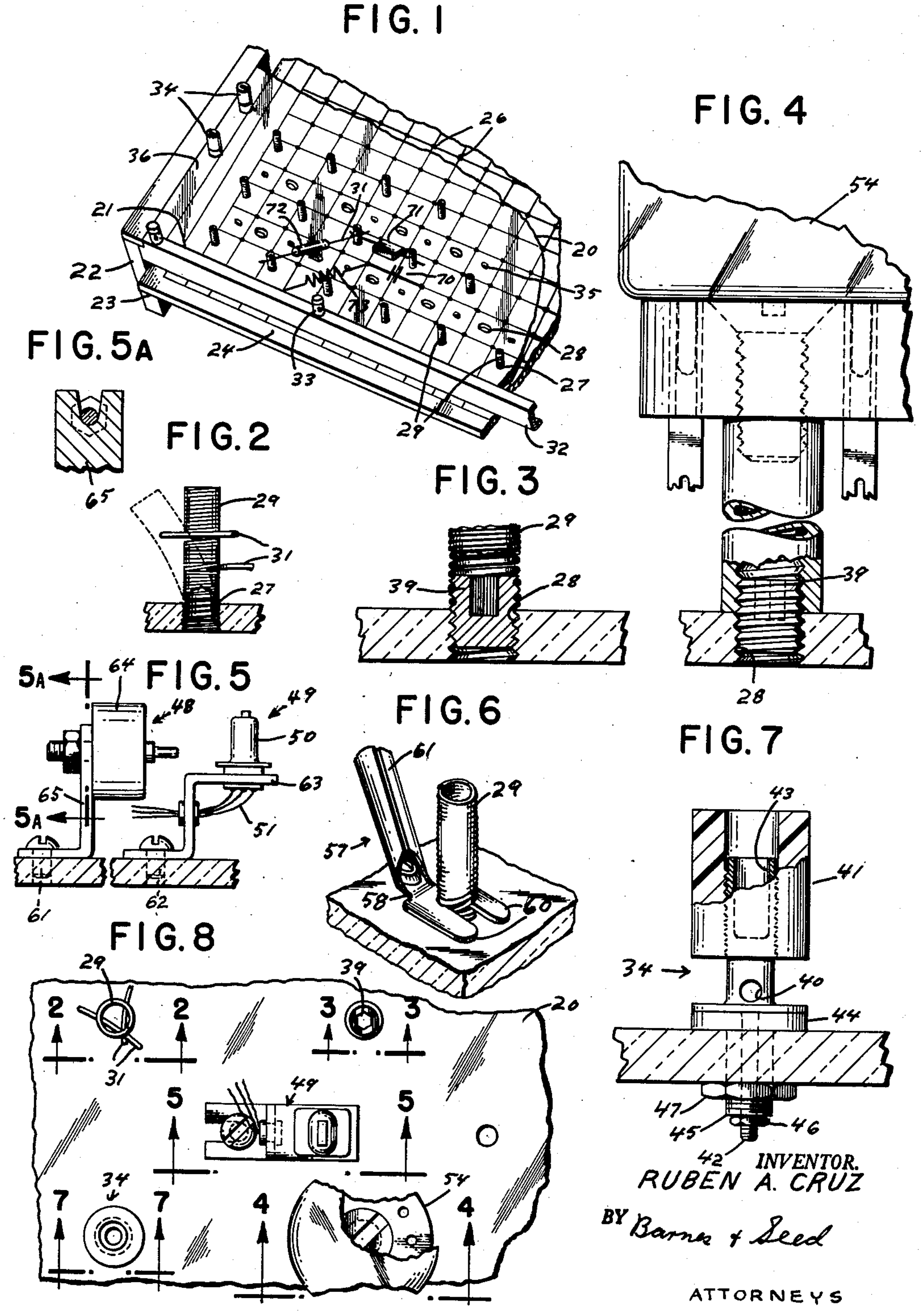
FIGURE 1 is a fragmentary perspective view of my invention.
FIG. 2 is a fragmentary vertical sectional view on line 2—2 of FIG. 8.
FIG. 3 is a fragmentary vertical sectional view drawn to an enlarged scale on line 3—3 of FIG. 8.
FIG. 4 is a fragmentary vertical sectional view on line 4—4 of FIG. 8 employing the same scale as FIG. 3.
FIG. 5 is a fragmentary transverse sectional view, the right portion of which is taken on line 5—5 of FIG. 8.
FIG. 5A is a vertical sectional view on line 5A—5A of FIG. 5.
FIG. 6 is a fragmentary perspective view showing a spade lug engaging a terminal coil.
FIG. 7 is a fragmentary vertical sectional view on line 7—7 of FIG. 8, again using the larger scale of FIGS. 3 and 4.
FIG. 8 is a fragmentary top plan view of the plate with several electrical components mounted thereon.

Referring to the accompanying drawing, a transparent mounting plate 20 is supported by a surrounding rigid rectangular wood frame consisting of a front piece 21 and a back piece (not shown) and two downwardly projecting supporting side boards, one of which is shown in FIG. 1 and designated 22.

Each sideboard has an inwardly facing horizontal groove spaced a moderate distance below the front piece 21. These two grooves 23, one along each side, produce a slide-way for a removable circuit-displaying tray 24. Such grooves locate the tray with respect to the transparent mounting plate 20, so that permanent markings 26 appearing on the tray surface are positioned directly below a regular pattern of rectangularly spaced terminal holes 27 tapped on the transparent board. Centered in relation to each set of four of said holes 27 which produce each of said rectangles are mounting holes 28 which are identical with the holes 27. Smaller auxiliary holes 35 are tapped into the mounting plate 20 in positions spaced midway between the holes 27 on the fore-and-aft lines of the latter.

Helical springs 29 are threaded into the holes 27 to serve as terminals for circuit components. This mounting of the components is accomplished by pulling the coils of one spring terminal slightly apart and slipping in one connecting lead 31 which upon release of the coils is resiliently gripped between two adjacent convolutions of the spring. The opposite connecting lead which provides the second connection for such component is similarly attached to another nearby spring. It is readily apparent that the lead may be inserted in the spring along any horizontal direction and that a multiplicity of wires may be inserted in the same spring terminal. It should be here noted that such springs, when threaded into the tapped holes, become permanent adjuncts of the plate 20, the threading being performed by a machine.

A method of removably securing springs to the mounting plate is employed for the mounting holes 28. Shown in FIG. 3, a threaded Allen-head stud 39 is first screwed into the hole 28, and the helical spring 29 is then threaded over the stud. The helical spring projects above the end of the stud so that the upper coils of the spring may be sprung apart to receive the connecting wires of the components.

Attached to the front edge of the mounting plate and running the length thereof is a ground strip 32 of aluminum composition having several binding posts 33 located along its length. This strip 32 desirably has a channel shape in section and receives the front piece 21 of the frame within its trough. Non-grounded binding posts 34 are positioned along the side edges 36 of the mounting plate.

The specific construction of the binding posts 34 is shown in FIG. 7. The post has a banana socket 43 formed in an upstanding stud prolongation of a base stem 42. Between the stud and stem is an integral flange which is brought to bear against a collar 44 by a nut 46 so as to clamp the stud and stem to the board. The collar is itself clamped by means of a nut 47 engaging a hollow stem 45. The stud is pierced with a hole 40 above the flange, and is externally threaded to receive a binding cap 41.

Shown in FIG. 5 are two mountings 48 and 49 secured by screws 61 and 62 in respective auxiliary holes 35. A tube 50 is shown inserted in an upper horizontal portion 63 provided by one of such mountings, with its leads designated by 51. A pot 64 is shown attached to an upstanding leg 65 provided by the other of said mountings.

Still another means of mounting a component such as 54 is shown in FIG. 4 where the component is mounted directly on one of the Allen-headed studs 39 occupying one of the tapped holes 28.

FIG. 6 shows a spade lug 57 which has its lower end 58 bifurcated with the two tines 60 engaging the spring terminal 29 on either side thereof, thus firmly securing the lug to the spring. A lead or a component may then be inserted into the hollow body portion 61 which is rigidly secured to and extends upwardly from the bifurcated end.

When the plate is used in constructing a circuit, the tray 24 is slid out from beneath the transparent plate 20. If the surface of the tray is furnished with a chalk board surface, the circuit may be sketched directly onto the tray. Otherwise a paper overlay, preferably graph stock, is used with the terminal markings 26 showing through, and the circuit is sketched on the paper. In either case the circuit is sketched with the terminal markings 26 as the terminal points for the components.

The tray is then slid under the transparent face plate 20 with the terminal markings lying directly below their respective terminal coils 29. The components are now mounted onto the face plate according to the symbols appearing on the diagrammatic sketch below. For example in FIG. 1, a capacitor 71 which is the physical counterpart of the symbol 70 is mounted directly above said symbol. Likewise the resistor 72 is mounted directly above the resistor symbol 73. In this manner the entire circuit is constructed.

If any changes in the circuit are desired, the tray is slid out, the appropriate changes are made in the circuit diagram, and the tray is reinserted beneath the face plate. Then the components are relocated according to the changes on the circuit diagram.

If it is desired to mount a component such as a tube from which several leads extend, a mounting 63 as shown in FIG. 5 may be used to mount the tube from an auxiliary hole 35. The leads 51 may then be connected to their appropriate terminal coils. Or the tube may be mounted over a stud 39 as shown in FIG. 4.

Where a more permanent lead connection is desired, a binding post 34 as shown in FIG. 7 may be inserted into a mounting hole 23. To place the mounting post in a smaller auxiliary hole 35, the stem 42 may be inserted directly into the smaller hole, thus eliminating the need of the screw and collar or flange member 44.

When the location of a component or a lead is changed frequently, a spade lug 57 as shown in FIG. 6 may be used, with the component or lead being mounted on the body 61 of the lug. The lug itself may be slipped in and out of various terminal coils so as to move the component to a new location.

It is believed that the invention will have been clearly understood from the foregoing detailed description of my illustrated now preferred embodiment. Minor changes in the details of construction will suggest themselves and I accordingly intend that no limitations be implied and that the hereto annexed claims be given a scope fully commensurate with the broadest interpretation which the employed language fairly permits.

What I claim is:

1. An electrical device comprising a transparent mounting place, a plurality of coil springs mounted on an upper surface of said mounting plate so that the axes of said springs extend substantially normal to the upper surface of said plate, said springs being arranged in a plurality of equally spaced parallel lateral rows and a plurality of equally spaced parallel transverse rows extending normal to said lateral rows so as to form a plurality of rectangles with one of said springs at the corner of each rectangle, a frame supporting said mounting plate, a tray slidably and removably supported on said frame directly below and parallel to said mounting plate, said tray having an electrical circuit diagram on its surface adjacent said mounting plate, a plurality of electrical circuit components above the upper surface of said mounting plate and above corresponding electrical symbols of said circuit diagram, each of said components having spaced ends extending substantially parallel to said upper surface, each of said ends extending between and frictionally gripped by adjacent convolutions of one of said coil springs, whereby said components may be easily detached from said springs.

2. A device as defined in claim 1, wherein said springs are mounted in holes in said mounting plate and wherein a plurality of lateral and transverse rows of holes are formed in said mounting plate parallel to said lateral and transverse rows of springs respectively, each of said lateral rows of holes comprising alternate large and small holes, and said transverse rows comprising rows of said small holes only and alternate rows of said large holes only, said large holes being of the same diameter as the diameter of the holes mounting said springs.

3. A device as defined in claim 2, wherein at least some of the ends of said components each comprise a forked plate, an aluminum ground channel enclosing one edge of said mounting plate and extending parallel to said lateral rows of springs, a plurality of binding posts secured to and extending upwardly from said ground channel, and a row of binding posts secured along another edge of said mounting plate so as to extend perpendicular to said channel.

References Cited in the file of this patent

UNITED STATES PATENTS

| | | |
|---|---|---|
| 1,946,889 | Wessel | Feb. 13, 1934 |
| 2,435,136 | Gardenhour | Jan. 27, 1948 |
| 2,592,552 | De Florez | Apr. 15, 1952 |
| 2,882,618 | Thompson | Apr. 21, 1959 |